US008941662B2

(12) United States Patent
Pfeifle

(10) Patent No.: US 8,941,662 B2
(45) Date of Patent: Jan. 27, 2015

(54) METHOD AND DEVICE FOR RENDERING AREAS BOUNDED BY CURVES USING A GPU

(75) Inventor: Ronald Friedrich Pfeifle, Waterloo (CA)

(73) Assignee: BlackBerry Limited, Waterloo (CA)

( * ) Notice: Subject to any disclaimer, the term of this patent is extended or adjusted under 35 U.S.C. 154(b) by 274 days.

(21) Appl. No.: 13/469,920

(22) Filed: May 11, 2012

(65) Prior Publication Data
US 2012/0287135 A1  Nov. 15, 2012

Related U.S. Application Data

(60) Provisional application No. 61/485,300, filed on May 12, 2011.

(51) Int. Cl.
*G06T 11/20* (2006.01)
*G06T 15/50* (2011.01)

(52) U.S. Cl.
CPC .................................. *G06T 11/203* (2013.01)
USPC ........................... 345/442; 345/426; 345/441

(58) Field of Classification Search
None
See application file for complete search history.

(56) References Cited

U.S. PATENT DOCUMENTS

| 6,535,213 | B1 * | 3/2003 | Ogino et al. | 345/442 |
|---|---|---|---|---|
| 6,654,713 | B1 * | 11/2003 | Rethman et al. | 703/19 |
| 7,239,319 | B2 | 7/2007 | Loop | |
| 7,564,459 | B2 | 7/2009 | Loop et al. | |
| 7,868,887 | B1 * | 1/2011 | Yhann | 345/442 |
| 2006/0066621 | A1 * | 3/2006 | Herceg et al. | 345/501 |
| 2007/0097123 | A1 | 5/2007 | Loop et al. | |
| 2011/0285722 | A1 * | 11/2011 | Kilgard et al. | 345/442 |
| 2011/0285736 | A1 * | 11/2011 | Kilgard | 345/584 |
| 2011/0285747 | A1 * | 11/2011 | Kilgard | 345/613 |

OTHER PUBLICATIONS

L. Gonzalez-Vega and I. Necula, "Planar rational cubic Bezier curve implicitization", Proceedings of the 4th International Symposium on Symbolic and Numeric Algorithms for Scientific Computing, Oct. 9-12, 2002.
M.S. Floater, "Rational cubic Implicitization", in Mathematical Methods for Curves and Surfaces, M. Daehlen and T. Lyche and L.L. Schumaker editors, Vanderbilt University Press—Nashville, 1995, pp. 151-159.
M. Garland and D.B. Kirk, "Understanding Throughput-Oriented Architectures", Communications of the ACM, vol. 53, No. 11, pp. 58-66.

(Continued)

*Primary Examiner* — Joni Richer
*Assistant Examiner* — Yi Wang
(74) *Attorney, Agent, or Firm* — Geoffrey deKleine; Borden Ladner Gervais LLP

(57) ABSTRACT

A method is provided for rendering pixels based on a certain type of Bézier curve, called a simple Bézier arch. The method uses an implicit function to determine whether each pixel in a domain triangle containing the arch is on the arch, on one side of the arch, or on the other side. The function's parameters can be linearly interpolated to allow efficient rendering of the triangle by a GPU. A method is also provided for applying the aforementioned method to render pixels, based on a non-linear Bézier curve having at most four control points, by subdividing the curve into simple Bézier arches as necessary. A computing device for performing these methods is also provided.

18 Claims, 8 Drawing Sheets

(56) References Cited

OTHER PUBLICATIONS

Y. Kokojima and K. Sugita and T. Saito and T. Takemoto, "Resolution independent rendering of deformable vector objects using graphics hardware", ACM SIGGRAPH 2006 Sketches.

C. Loop and J. Blinn, "Resolution Independent Curve Rendering using Programmable Graphics Hardware", ACM Transactions on Graphics, vol. 24, No. 3, pp. 1000-1009.

C. Loop and J. Blinn, "Rendering Vector Art on the GPU", in GPU Gems 3, H. Nguyen editor, Addison-Wesley Professional—Upper Saddle River, 2007, pp. 543-561.

N. Nakamura and Y. Kokojima and Y. Yamauchi, "Rendering of vector objects on curved surface using pivot triangle primitives", ACM SIGGRAPH 2009 Posters.

Richard R. Patterson, "Parametric cubits as algebraic curves", Computer Aided Geometric Design, vol. 5, No. 2, pp. 139-159.

A.J. Rueda and J. Ruiz de Miras and F.R. Feito, "Technical Section: {GPU}-based rendering of curved polygons using simplicial coverings", Computers & Graphics, vol. 32, No. 5, pp. 581-588.

T.W. Sederberg and D.C. Anderson and R.N. Goldman, "Implicit Representation of Parametric Curves and Surfaces", Computer Vision, Graphics, and Image Processing, vol. 28, No. 1, pp. 72-84.

T.W. Sederberg and D.C. Anderson and R.N. Goldman, "Implicitization, Inversion and Intersection of Planar Rational Cubic Curves", Computer Vision, Graphics, and Image Processing, vol. 31, No. 1, pp. 89-102.

M. Stone and T. DeRose, "A Geometric Characterization of Parametric Cubic Curves", ACM Transactions on Graphics, vol. 8, No. 3, pp. 147-163.

Randi J. Rost, "Open GL Shading Language", (Boston: Pearson Education, Inc., 2004) at pp. 33-35, 37-41, 41-45.

Gerald Farin, Curves and Surfaces for Computer Aided Geometric Design A Practical Guide, 2d ed (San Diego: Academic Press, Inc., 1990) at pp. 165, 231-235, 303-310.

M S Floater: "Rational Cubic Implicitization", Methematical Methods in CAGD III, Jan. 1, 1995, pp. 1-9.

Extended European Search Report dated Aug. 22, 2012, issued in respect of corresponding European Patent Application No. 12167615.9.

Examiner's Report dated Apr. 14, 2014, issued in respect of corresponding Canadian patent application No. 2,776,678.

\* cited by examiner

METHOD AND DEVICE FOR RENDERING AREAS BOUNDED BY CURVES USING A GPU

CROSS-REFERENCE TO RELATED APPLICATION

The present application claims priority to U.S. provisional application with Ser. No. 61/485,300, filed 2011 May 12, the contents of which are hereby incorporated by reference.

FIELD OF TECHNOLOGY

The present application generally relates to computer graphics and, in particular, to rendering areas bounded by curves using a graphics processing unit (GPU).

BACKGROUND

It is common practice to off-load some of the computing burden of a computing device's central processing unit (CPU) to one or more, specialized co-processors, such as for performing floating-point arithmetic or input-output (I/O) routines while the CPU attends to other matters. Even mobile devices, such as smartphones and tablet computers, are seeing a rise in such parallelism.

In particular, a graphics processing unit (GPU) is programmable hardware specifically designed to perform certain routines needed to render graphics on a visual display. The term "graphics" is used in this disclosure for still or animated images that are computer-generated rather than captured by a digital camera or scanner. More importantly, they are vector graphics, a term of art used in contrast with raster graphics, which include digital images (such as JPEGs), videos (such as MPEGs), and bitmapped icons (such as GIFs), which are stored in a compressed form that can be reconstructed by decompressing. Vector graphics are stored in the form of a "model," which is more akin to a specification as to how to generate the image to be displayed; they can typically be scaled larger, without resulting in the pixilated effect that is well known to occur when a photographic image is enlarged significantly beyond its original dimensions.

A graphics model is typically created by means of a graphics design program. The model may include a sequence of commands in a scripting language (such as SVG). At an intuitive level, these are instructions such as: draw a point at $<x_1,y_1>$; draw a line from $<x_2,y_2>$ to $<x_3,y_3>$; move to $<x_4,y_4>$; draw a Bézier curve with control sequence $<x_5,y_5>$, $<x_6,y_6>$, $<x_7,y_7>$, $<x_8,y_8>$. Of course, other information, such as colours, is encoded as well. The user of a graphics design program usually does not write these instructions in the scripting language. Rather, he or she uses a WYSIWYG interface to design the graphics. For example, the interface often provides a user-friendly way to shape a Bézier curve by dragging its control points. The encoded instructions are then generated by the design program.

GPUs and the software that instructs their operation have co-evolved to handle the massive amount of computation needed to create and render graphics. A notable aspect of this co-evolution is the central role triangles have come to play in rendering. As meant herein, a "triangle" is a two-dimensional (2-D) region bounded by and including the three edges that comprise what is usually termed a "triangle" in geometry. A GPU can employ its own parallelism to render all the pixels in a triangle much more efficiently than a general-purpose CPU could; this is especially important for mobile devices dependent on battery power, as greater efficiency in rendering allows greater efficiency in power usage. In particular, if certain colour, texture, and other attributes are assigned to the vertices of a triangle, the GPU can linearly interpolate these attributes across the whole triangle very rapidly. Three-dimensional (3-D) scenes can be modelled in terms of many triangles; specifications for the model are stored in a computer graphics file. An applications programmer interface (API) provides a high-level language for communicating the graphics model to the GPU. Popular APIs, such as the OpenGL API or the DirectX API, are designed to handle 3-D graphics, but are used for 2-D graphics, as well. A program, such as a shader program, can execute on the GPU by means of an API.

GPU-driving APIs typically prohibit recursion, as it would preclude parallelization of computations, nullifying the advantages of using a dedicated GPU. This has profound implications for the rendering of curves. A classic, top-down approach to approximating a curve is to break it down into smaller and smaller pieces, until each piece can be adequately approximated by a line segment; similarly, regions on either side of the curve would be recursively broken down into finer and finer triangles. This classical approach of determining geometry on the fly cannot be adapted to the GPUs and APIs of concern herein. What GPUs and APIs need—prior to execution—is specific information about the geometry to be rendered.

Any curve can be defined in more than one way. As a toy example, the parabola in the xy-plane defined by $y=f(x)=x^2$ can be also defined by the parametric equation $f(t)=<t, t^2>$. Alternatively, the same set of points in plane can be specified by the implicit function $f(x,y)=y-x^2$; this implies where the curve is in that the points $<x, y>$ on the curve are precisely those that satisfy $f(x, y)=0$. The parametric function meshes well with the classical approach to approximating curves: If the curve is defined by $f(t)$ for t in a specified interval, then subdividing the curve amounts to subdividing the interval. The implicit function meshes well with GPU parallelism over a triangle containing the curve or a part thereof: For each pixel in the triangle, the same function can be rapidly computed to determine whether the point is on the curve (when $f(x, y)=0$), is on one side of the curve (when $f(x, y)>0$), or is on the other side of the curve (when $f(x, y)<0$). Thus, the implicit function allows a shader program to direct a GPU to render regions bounded by a curve.

Long before the advent of computer graphics, it was known to piece-wise approximate a curve by means of more-elementary curves. For example, a trigonometric function can be approximated (over a certain range of inputs) by means of a polynomial, whose computation requires only multiplication and addition. For the purposes of computer graphics, polynomials of degree greater than three are generally not used, since the additional computational expense is disproportionate to the visual benefits.

Bézier curves are a particularly important tool for (piece-wise) approximating a desired curve in computer graphics. A Bézier curve is defined geometrically by a sequence of control points; such a sequence is termed herein the "control sequence" of the curve. The curve begins at the first control point (the "initial endpoint"), ends at the last control point (the "terminal endpoint"), and is contained in the convex hull of all the control points. (The convex hull of a set of points is the smallest convex set containing that set of points. A set is convex if for any two points contained in the set, the line segment between the two points lies entirely in the set.) Control points in the control sequence other than endpoints are termed herein "attraction points" since they "attract" the curve toward them. Attraction points are often not on the curve. But an attraction point may be co-incident with an endpoint (and therefore on the curve). Attraction points may also be co-incident with each other. Even if an attraction point is co-incident with another control point, it still has an influence on the shape of the curve. Therefore, repeated control points in the control sequence for a Bézier curve are not superfluous. The ordering of control points in a control sequence is also crucial; the curve defined by control sequence $E_1$, G, H, $E_2$ will look very different from that defined by $E_1$, H, G, $E_2$. Furthermore, endpoints $E_1$ and $E_2$ can also be co-incident, in which case the curve begins and ends at the same location, forming a loop.

A Bézier curve is defined algebraically by a parametric equation, where the parameter runs from 0 at the initial endpoint to 1 at the terminal endpoint. This disclosure is only concerned with Bézier curves of order at most three; consequently, there will be no more than four control points in total. The curve will have degree at most three when there are a total of four control points, degree at most two when there are three control points. This disclosure is not concerned with Bézier curves whose control points are all co-linear, in which case the "curve" is a straight line segment, as there are more efficient techniques than Bézier curves for modeling and rendering straight lines and regions bounded by straight lines.

The ubiquity of Bézier curves for specifying graphics and the advantages of using implicit rather than parametric characterizations of curves for rendering graphics using a GPU have led to attempts to express Bézier curves by means of implicit functions.

Loop and Blinn (Charles Loop and Jim Blinn, "Resolution Independent Curve Rendering using Programmable Graphics Hardware," in ACM Transactions on Graphics, vol. 24, no. 3 (July) 2005, 1000-1009) have developed an implicit representation of a cubic Bézier curve for use by a shader program. Although the representation admits of very efficient computation by the GPU, the complex procedure for obtaining the representation is computationally expensive. In other words, there is a trade off between the efficiency achieved in the rendering phase and the time spent pre-processing in order to set up that efficient rendering.

Floater (M. S. Floater, "Rational Cubic Implicitization," in Mathematical Methods for Curves and Surfaces, M. Daehlen, T. Lyche, and L. L. Schumaker, eds., Vanderbilt University Press, Nashville, 1995, pp. 151-159) has developed an alternative implicit representation of a cubic Bézier curve. However, it is not useable by a shader program.

Thus, there is a need for a method of rendering regions bounded by Bézier curves having at most four control points, based on an implicit expression that is compact and can be computed efficiently by a shader program, yet requires few preparatory computations.

BRIEF DESCRIPTION OF THE DRAWINGS

Reference will now be made, by way of example, to the accompanying drawings, which show example embodiments of the present application, and in which:

FIG. 8 depicts representations of two graphics images rendered by means of methods disclosed herein; and similar reference numerals may have been used in different figures to denote similar components.

DESCRIPTION OF EXAMPLE EMBODIMENTS

In one aspect, a method of rendering pixels, based on a simple Bézier arch, is disclosed. The arch is defined by a control sequence consisting of (a) an initial endpoint E1, followed by (b) either (i) a single attraction point C0 or (ii) a first attraction point C1 followed by a second attraction point C2, followed by (c) a terminal endpoint E2, at least one attraction point being non-co-linear with the endpoints. The method comprises determining a domain triangle containing the arch and having as vertices E1, E2, and an intersection point I of rays emanating from the endpoints and passing through respective attraction points associated with the endpoints. The method further comprises, for each pixel in the domain triangle, computing a value of a function $f(\tau_0, \tau_1, \tau_2, d_1, d_2) = \tau_0 \tau_2 d_1 + \tau_1^2 d_2$, wherein $\tau_0, \tau_1, \tau_2$ are barycentric co-ordinates of that pixel, based on $E_1$, I, and $E_2$, respectively; wherein $d_1$ and $d_2$ are each linear functions of $\tau_0, \tau_1$, and $\tau_2$; and wherein the function evaluates to zero if that pixel is on the arch; and rendering that pixel based on the computed value.

In another aspect, a method of rendering pixels, based on a Bézier curve having at most four control points, is disclosed. The method comprises, if the curve is a simple Bézier arch, then performing the above-described method based on the curve and, otherwise, subdividing the curve into simple Bézier arches and then, for each of the resulting simple Bézier arches, performing the above-described method of claim based on that arch.

In yet another aspect, a computing device is disclosed. The device comprises a graphics processing unit (GPU) and a memory containing computer-executable instructions that, when executed by the computing device, cause the computing device to perform the above-described method, at least in part by means of the GPU.

In yet a further aspect, a non-transitory, processor-readable storage medium is disclosed. The medium stores processor-executable instructions in a magnetic, optical, solid-state, or like format. When executed by a computing device including a graphics processing unit (GPU), the instructions configure the computing device to perform the above-described method, at least in part by means of the GPU.

Figure 1:
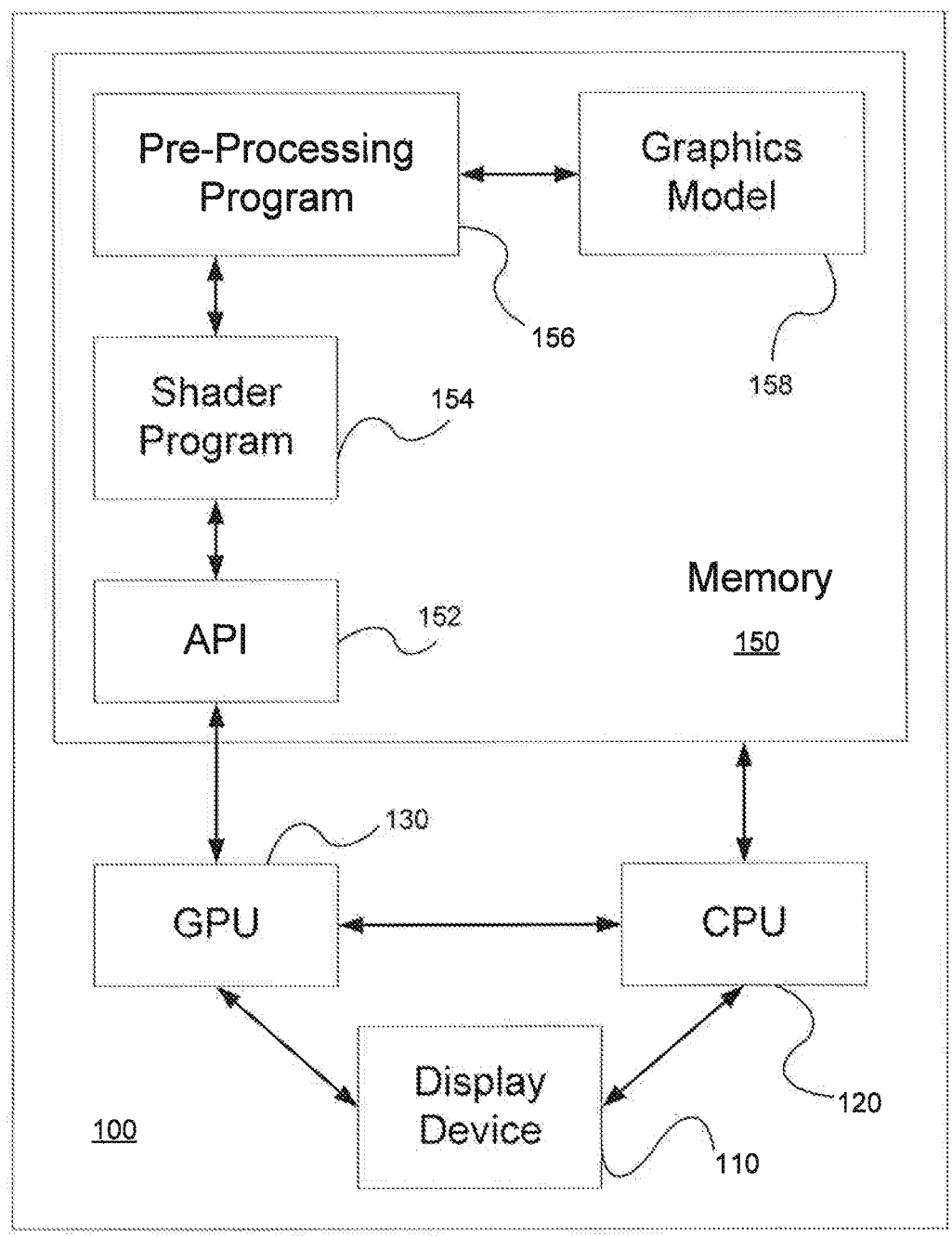
FIG. 1 shows a block diagram representing a computing device for rendering graphics by means of a shader program.

Referring first to FIG. 1, an example of a computing device for rendering computer graphics is depicted in a block diagram. Computing device 100 comprises hardware components of a computing device (not shown) together with software and data resident in memory 150 of the computing device. Other hardware components include display device 110, CPU 120, and GPU 130. Computer graphics are rendered in a visual format on display device 110 for viewing by a user of the computing device. CPU 120 is the primary manager of processes and resources on the computing device. In particular, it accesses memory 150 to fetch data and execute instructions stored thereon. It also directs GPU 130, which is a specialized processor, optimized to rapidly perform computations relevant to creating and rendering computer graphics.

On the software side, graphics-specific API 152 provides an interface for communicating with GPU 130 in its native machine language. Shader program 154 is computer code, written in a high-level language, such as GLSL (for the OpenGL API) or DirectX HLSL (for the DirectX API), for programming GPU 130 to shade pixels in rendering graphics. "Shading" pixels involves performing computations for each pixel and that, in some cases, computations of different types may be performed in stages, as will be explained shortly. Thus, shader program 154 is meant to represent a variety of implementation options, such as using a vertex shader module and a pixel shader module. The computer code constituting shader program 154 is designed to perform shading as do known shader programs, but the code is written specifically to implement the methods of the present disclosure. Additionally, pre-processing program 156 performs calculations that are specific to the particular graphics to be rendered; values it calculates are passed on to shader program 154. The computer code constituting pre-processing program 156 is also written specifically to implement the method of the present disclosure. Shader program 154 and pre-processing program 156 are depicted separately in FIG. 1 to represent two different functional tasks, but the functionality of both could be combined into a single software module.

On the data side, graphics model 158 is a file storing a specification of the graphics to be rendered. It is expressed in a format recognizable and usable by pre-processing program 156.

Figure 2:
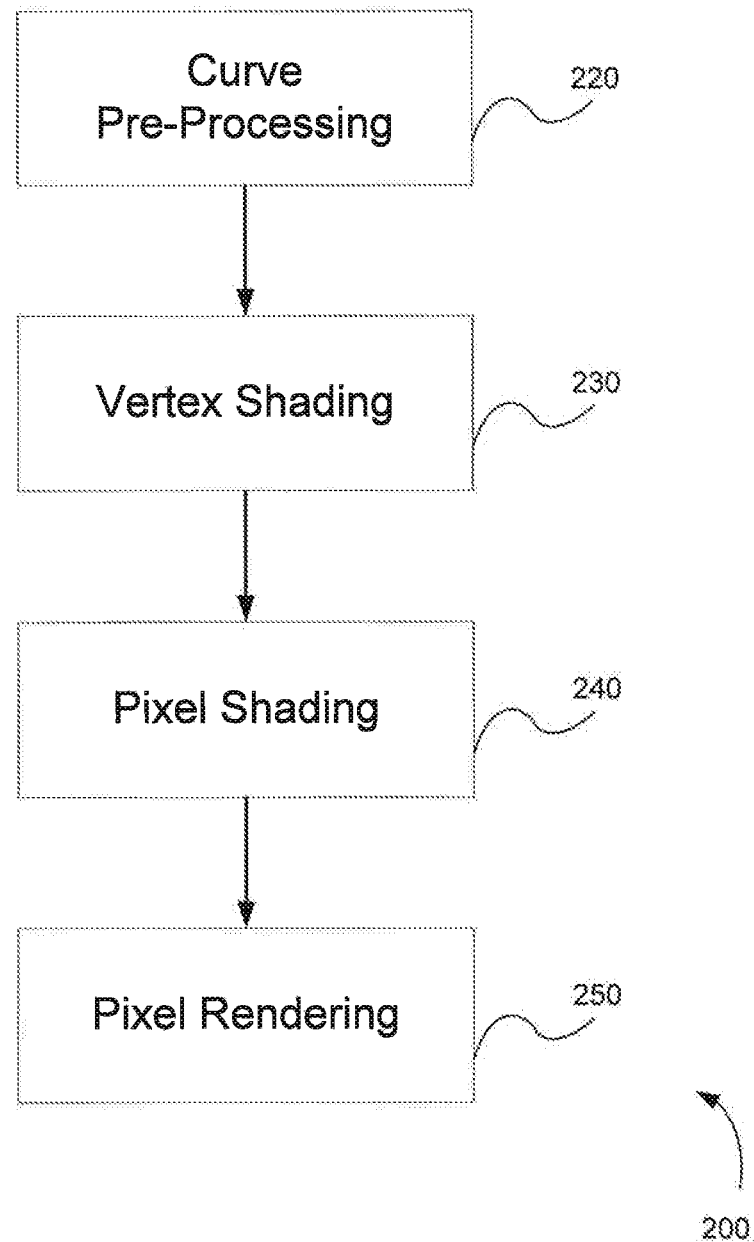
FIG. 2 shows a block diagram representing a graphics pipeline, outlining the basic stages of rendering computer graphics relevant in this disclosure.

Referring now to FIG. 2, a block diagram depicts the flow of execution in simplified graphics pipeline 200. The term "graphics pipeline" refers to the various stages of creating and rendering graphics. In different embodiments, some stages can be performed in software, some can be performed in hardware, and some can be performed in either software or hardware. The input to graphics pipeline 200 is a model of the graphic to be rendered, such as graphics model 158 of FIG. 1. The model comprises graphics primitives, such as line segments and triangles. Triangles are the primitive of concern in this disclosure, so graphics pipeline 200 is simplified to single out triangle-based rendering. Moreover, since this disclosure focuses on 2-D graphics, certain operations, such as projections, lighting, and texture blending, that are of interest in 3-D graphics are not germane to the current disclosure, have been omitted from graphics pipeline 200.

Triangle pre-processing 220 comprises various computations to provide certain attributes, such as position, colour, and texture information for each vertex of each triangle in the model for the graphics to be rendered. Triangle pre-processing 220 can be performed by pre-processing program 156 of FIG. 1.

Vertex shading 230 comprises manipulating the position, colour, and texture information for each vertex. The parallel-processing power of GPU 130 may make it possible to perform this processing simultaneously for each vertex in the model. In some modern graphics pipelines, geometry shading (not shown) occurs before vertex shading 230; this involves operating on graphics primitives (that were input to the graphics pipeline 200) and generating new primitives. The steps of vertex shading 230 can be performed by shading program 154 of FIG. 1 or by a separate vertex-shading module (not shown).

Pixel shading 240 comprises determining what display device 110 should ultimately display for each pixel is part of the visual display that a viewer observes. For 3-D graphics, this could involve applying illumination (including shadow effects and specular highlights), texture, and other data. The parallel-processing power of GPU 130 may make it possible to perform this processing simultaneously for each pixel in a triangle, based on the data vertex shading 230 calculated for each vertex of the triangle. For 3-D graphics, this could involve applying non-linear geometric transformations (for example, projections of an image onto a surface). All the pixel-wise computations of concern in this disclosure are based on linear functions of the attributes computed for the vertices of the triangle. For an entire triangle, the GPU may be able to compute the same function, for each pixel in the triangle, by efficient, parallel interpolation. The steps of pixel shading 240 can be performed by shading program 154 of FIG. 1 or by a separate pixel-shading module (not shown).

Pixels are the "indivisible atoms" that make up the visual display that a viewer sees on display device 110, in the sense that each pixel is a minimal area on the display device (or in an off-line image file) that can be assigned any one of the possible colours that can be displayed. On full-colour display devices, each pixel has three (or, on some devices, four) "sub-atomic" colour components. On many display devices, the colour components for each pixel are red, green, and blue values (typically each having an integer value in the range 0 to 255, inclusive), which blend to appear to a viewer of display device 110 as a colour in what is known in the art as the "RGB colour space."

There is a second sense in which each pixel may be considered a composite of "subatomic" fragments. For example, even 2-D graphics can represent a partially transparent foreground object through which a background object can be partially seen; each pixel displayed for the foreground object is a blend of a fragment from the foreground object and a fragment from the background. For 3-D graphics, illumination and texture can contribute fragments to a pixel. Pixel shaders are also known as fragment shaders, since multiple fragments from multiple objects typically must be manipulated to find the final pixel value. The focus of this disclosure is simply on whether a pixel (i.e., an xy-location on display device 110) is on a curve, is on one side of the curve, or is on the other of the curve. Once that tri-partite determination has been made, other graphics attributes can be used accordingly.

At the end of graphics pipeline 200, pixel rendering 250 is performed by GPU 130 on display device 110. Alternatively, a "rendering" based on the final rendering information computed by shader program 154 according to the steps of pixel shading 250 can be saved to an image file in memory 150 or sent to a peripheral device (not shown), such as a printer.

The relationship between the hardware, software, and data that enable computing device 100 to render graphics and the steps of graphics pipeline 200 can be summarized as follows. Triangle pre-processing 220 can be performed by pre-processing program 156. Vertex shading 230 and pixel shading 240 can be performed by GPU 130 according to shader program 154, which is software that communicates with GPU 130 by means of graphics-specific API 152. Pixel rendering 250 can be performed by GPU 250 without further instruction from shader program 154, but under the ultimate control of CPU 120, which has overall control of computing device 100.

Figure 3:
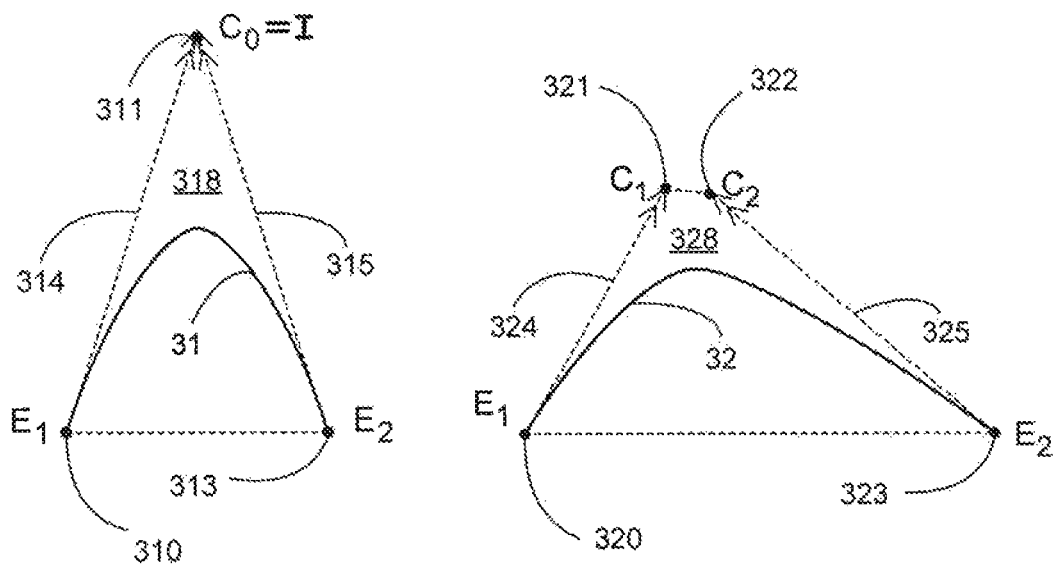
FIG. 3 shows simple Bézier arches having at most four control points.
Figure 3:
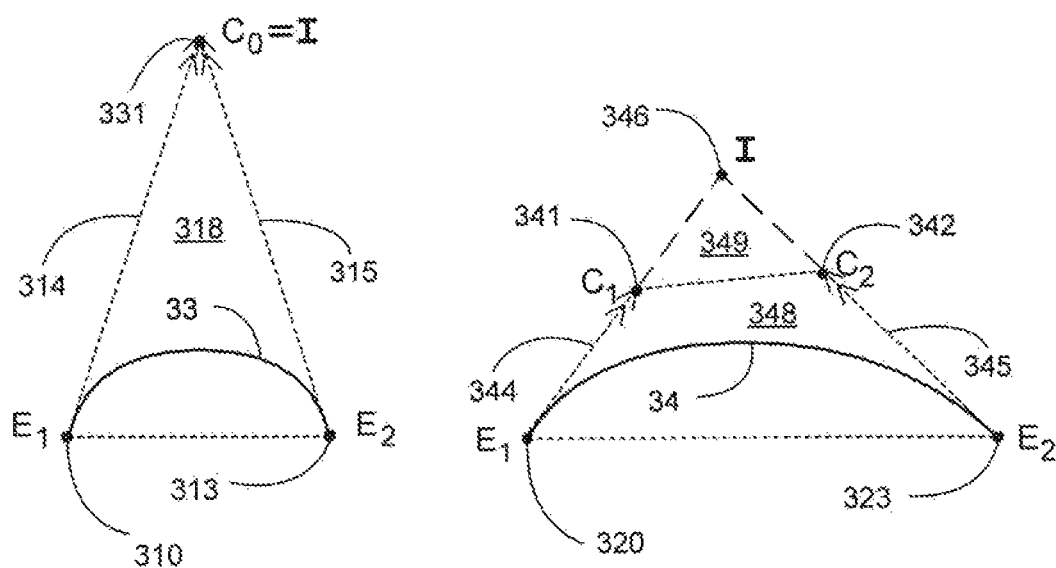
Figure 4:
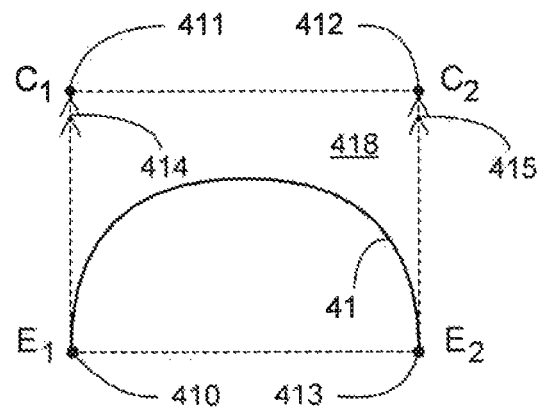
FIG. 4 shows Bézier curves having at most four control points that are not simple Bézier arches and for which the control points for each curve do not define a domain triangle.
Figure 4:
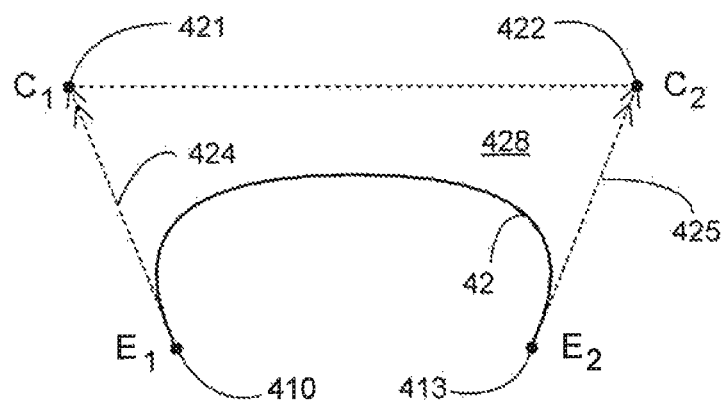
Figure 4:
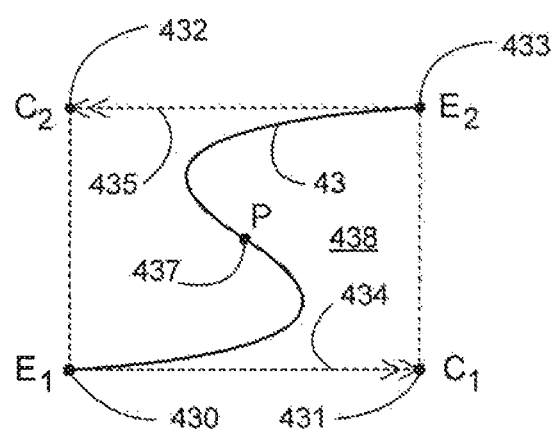
Figure 5:
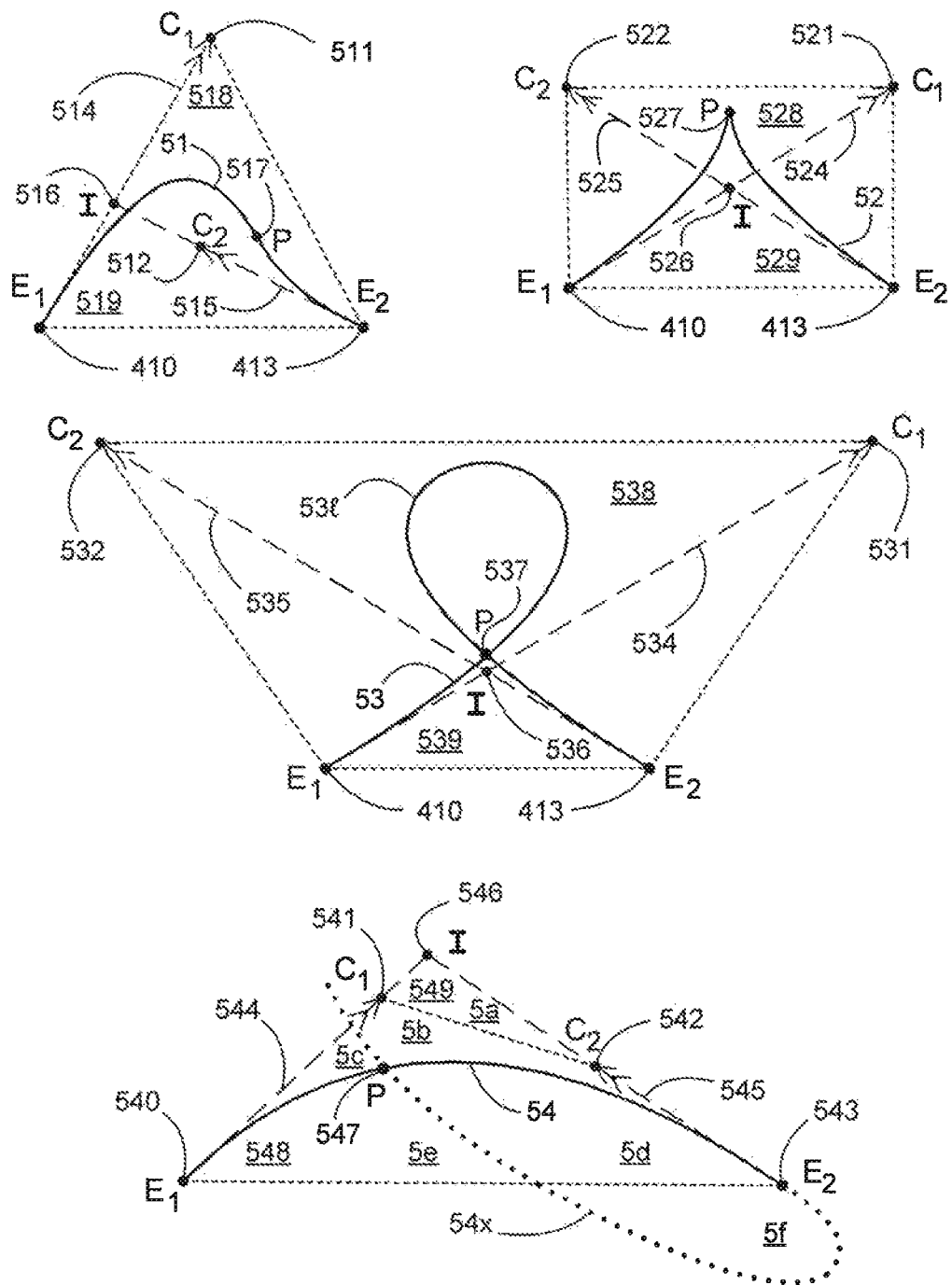
FIG. 5 shows Bézier curves having at most four control points that are not simple Bézier arches and which each contain an anomalous point.

Reference in now made to FIGS. 3 to 5, which illustrate a variety of Bézier curves. As will be explained, for the method of this disclosure, curves of the types in FIGS. 4 and 5 will be broken down into curves of the types in FIG. 3. Each of the curves in FIGS. 3 to 5 has two endpoints, $E_1$ and $E_2$, that are on the curve and at least one attraction point that is not on the curve. Each curve can be parameterized by a variable t over the interval [0, 1]; in other words, there is a point-valued function $f(t) = \langle x(t), y(t) \rangle$ such that the set of points $\langle x(t),$ $y(t)>$, for all values of t in the interval [0, 1], coincides with the set of points on the curve from $E_1$ to $E_2$. If, under such a parameterization, $E_1=<x(0),y(0)>$ and $E_2=<x(1),y(1)>$, the curve can be said to "begin" at initial endpoint $E_1$ and "end" at terminal endpoint $E_2$. As mentioned previously, we will not consider curves of degree higher than three; consequently, each curve will have at most four control points in total.

Each of the Bézier curves of FIGS. 3 to 5 has attraction points, $C_1$ and (except for curves 31 and 33) $C_2$, which "attract" the curve. In particular, each curve first aims for $C_1$ as it leaves $E_1$ tangent to ray($E_1$, $C_1$), such as ray 325 for curve 32 depicted in FIG. 3. By the time the curve reaches $E_2$, it is coming from the direction of $C_2$, tangent to the ray($E_2$, $C_2$), such as ray 325 for curve 32 or, if there is only one attraction point ($C_1$), from the direction of $C_1$, tangent to the ray($E_2$, $C_1$), such as ray 315 for curve 31. Every ray defined herein is oriented to emanate from an endpoint of the curve rather than at an attraction point for reasons that will be explained later.

Rays, of course, each extend forever in one direction, so the arrow-heads depicted on rays in the drawings of this disclosure are placed only to indicate the sense of the direction in which the rays extend; there in no notion of "magnitude" associated with a ray as there is with vectors.

The methods of this disclosure are described in terms of cubic curves, which each have four control points total. But unlike some previously known methods, the methods of this disclosure are applicable to quadratic curves, each having only three control points total, and to cubic curves that are equivalent to quadratic curves. FIG. 3 depicts two quadratic curves. Each of curves 31 and 33 has endpoints $E_1$ 310 and $E_2$ 313. Their respective attraction points, $C_0$ 311 and $C_0$ 331, have the same location. They differ only in that they are associated with different weights, which constitute each point's level of "attraction." $C_0$ 311 has a weight of 1, and the resulting curve 31 is a parabolic arc. $C_0$ 331 has the same co-ordinates, but a weight less than 1; the resulting curve 33 is an elliptical arc. If a like-positioned attraction point had a weight greater than 1, a hyperbolic arc would result. Herein, an attraction point is considered to be a point and its associated weight; thus we denote $C_0$ 311 and $C_0$ 331 with different feature numbers.

A Bézier curve with three non-co-linear control points $E_1$, $C_0$, and $E_2$ will always be amenable to the methods of this disclosure. This can be illustrated with reference to curves 31 and 33. The attraction point $P_1$ "associated" with $E_1$ 310 is the closest attraction point in control-sequence order that is not co-incident with $E_1$, viz., $C_0$ 311/331; the attraction point $P_2$ associated with $E_2$ 313 is also $C_0$. Ray($E_1$,$P_1$) 314 and ray($E_2$,$P_2$) 315 will intersect. (This will not always be the case for some cubic curves.) The intersection point I is the sole attraction point $C_0$ 311/331. Triangle($E_1$,I,$E_2$) is co-extensive with the convex hull of the control points. Since the convex hull always contains its associated curve, in particular, this triangle contains the curve 31/33. (This will not always be the case for some cubic curves.) Moreover, an implicit function defined herein can be used to render the entire triangle correctly. Thus, the curve qualifies as what is herein called a "simple Bézier arch," and triangle($E_1$,I,$E_2$) is called the arch's "domain triangle."

It is well known that every quadratic Bézier curve with 3 control points has an equivalent representation as a cubic Bézier curve with 4 control points. Conversely, in some cases, if an arch as originally specified has two attraction points $C_1$ and $C_2$ that are positioned and weighted in a certain manner, the arch as an equivalent quadratic representation and has an equivalent control sequence of the form $E_1$, $C_3$, $E_2$. As will be seen later, quadratic Bézier curves as well as cubic Bézier curves that have equivalent quadratic representations will be handled differently than cubic Bézier curves that do not have equivalent quadratic representations.

It also well known that a cubic Bézier curve with control points $E_1$, $C_1$, $C_2$, and $E_2$ such that $C_1$ and $C_2$ are co-incident with each other or such that one of them is coincident with $E_1$ or $E_2$ does not, in general, have an equivalent representation as a quadratic Bézier curve with 3 control points. For example, compared to curve 31 with control sequence $E_1$, $C_0$, and $E_2$, a first variant (not shown) of curve 31 with control sequence $E_1$, $C_1$, $C_2$, and $E_2$, where $C_1$ and $C_2$ each located at $C_0$, would resemble curve 31, but would have different curvature characteristics, since it would be cubic.

In a second variant (also not shown) of curve 31, a slightly different cubic curve would result if $C_2$ were located where $C_0$ 311 is in FIG. 3, and $C_1$ is actually co-incident with $E_1$. Of special note is that ray($E_1$,$C_1$) is indeterminate: Since the two points are at the same location, the ray could point in any direction. This illustrates why the attraction point $P_1$ defined herein to be "associated" with $E_1$ is not merely the closest one in control-sequence order ($C_1$, located at $E_1$ 310), but the closest one in control-sequence order that is not co-incident with $E_1$, which is $C_2$ (located at $C_0$ 311 in this variant of curve 31). The point $P_2$ associated with $E_2$ is also $C_2$. Ray($E_1$,$P_1$) 314 is well-defined and intersects ray($E_2$,$P_2$) 315 in intersection point I =$C_2$. As with curve 31 as shown, triangle($E_1$,I,$E_2$) qualifies as a domain triangle, and this variant curve qualifies as a simple Bézier arch.

It is well known that Bézier curves can be parameterized by a variable t over the interval [0, 1] in terms of a function that is either a polynomial (i.e., a sum of terms each consisting of a constant times a power of t) or a rational function (i.e., a quotient formed by a polynomial in t divided by another polynomial in t). It is further known that if the weights associated with attraction points are all 1, the function can be expressed as a polynomial.

Continuing in reference to FIG. 3, curves 32 and 34 each have the same endpoints, $E_1$ 320 and $E_2$ 323, but different attraction points, $C_1$ 321 and $C_2$ 322 for curve 32 versus $C_1$ 341 and $C_2$ 342 for curve 34. For curve 34, $P_1=C_1$, $P_2=C_2$, and ray($E_1$,$P_1$) 344 and ray($E_2$,$P_2$) 345 are shown to intersect at point I 346. Triangle($E_1$,I,$E_2$) 349 qualifies as a domain triangle for curve 34, and the curve is a simple Bézier arch. Corresponding ray($E_1$,$P_1$) 324 and ray($E_2$,$P_2$) 325 would likewise intersect in a point to define a domain triangle for curve 32, but the intersection point and domain triangle are not shown.

The concepts of "simple Bézier arch" and the "domain triangle" for such a curve are linked. The significance of a domain triangle is that it will be the fundamental region of pixels which will be rendered as a group by GPU 130 so that the two sub-regions of the triangle on opposite sides of the curve can (if so specified) be rendered differently based on the sign of an implicit function defining the curve. For example, when the graphic is a character in a font, one side of the curve will be white and the other will be black (or other colour). The linkage of the two concepts as defined herein is so rigid that a simple Bézier arch exists if and only if a domain triangle exists. It is necessary that the curve be contained within a triangle formed by the intersection of two rays emanating from respective endpoints and passing through attraction points associated the endpoints, but it will be shown later that this is not a sufficient condition. The domain triangle of a simple Bézier arch will always contain the convex hull of the control points for the arch, but this will also be shown not to be a sufficient condition.

Each curve depicted in FIG. 3 is a simple Bézier arch and therefore has a domain triangle, but this is not the case for any of the curves in FIGS. 4 and 5. These counterexamples will facilitate stating and explaining the precise necessary and sufficient conditions for a Bézier curve to be a simple Bézier arch.

Turning now to FIG. 4, three Bézier curves are shown that are not simple Bézier arches, because in each case ray($E_1,P_1$) and ray($E_2,P_2$) do not intersect. Curves 41 and 42 each have the same endpoints, $E_1$ 410 and $E_2$ 413, but different attraction points, $C_1$ 411 and $C_2$ 412 for curve 41 versus $C_1$ 421 and $C_2$ 422 for curve 42. Ray($E_1,P_1$) 414 and ray($E_2,P_2$) 415 do not intersect because they are parallel, whereas ray($E_1,P_1$) 424 and ray($E_2,P_2$) 425 do not intersect because they diverge. Convex hulls 418 and 428 contain curves 41 and 42, respectively. However, in each case, ray($E_1,P_1$) 414/424 and ray($E_2,P_2$) 415/425 do not define a domain triangle containing the Bézier curve as needed for the purposes of rendering a triangle according to the methods of this disclosure.

Curve 43 from $E_1$ 430 to $E_2$ 433 is shaped by attraction points $C_1$ 431 and $C_2$ 432 that are arranged differently than for the previously described curves; specifically, the four control points are in a different cyclic order around convex hull 438, which is quadrilateral($E_1,C_2,E_2,C_1$). The result is that ray($E_1,P_1$) 434 and ray($E_2,P_2$) 435 do not intersect because they are headed in substantially opposite directions, irrespective of the fact that they happen to be parallel. Of note is inflection point P 437, a feature not present in any of the curves previously described. An inflection point of a curve is a point where the curve changes its curvature (say from positive to negative). Whereas for each of the preceding curves, the region bounded by the curve from $E_1$ to $E_2$ and the line segment between $E_1$ and $E_2$ is a convex region. By contrast, the line segment between $E_1$ 430 and $E_2$ 433 intersects curve 43 from $E_1$ 430 to $E_2$ 433; the "convex side" of curve 43 switches from one side of the curve to the other at point P 437. An inflection point at an "interior point" of the curve (i.e., a point that would correspond to $f(t)=<x(t),y(t)>$, with $0<t<1$) is problematic in that it precludes the existence of a domain triangle that contains the curve as required for the methods of this disclosure. Therefore, for the purposes of this disclosure, inflection points at interior points of the curve are one type of point herein termed "anomalous."

Referring now to FIG. 5, additional Bézier curves are shown that are not simple Bézier arches and that each contains an anomalous point P. For curves 51, 52, and 53, in each case, ray($E_1,P_1$) and ray($E_2,P_2$) intersect at a point I, but triangle($E_1,I,E_2$) does not contain the Bézier curve; thus the triangle cannot serve as a domain triangle for the purposes of the methods of this disclosure.

The first example shown in FIG. 5, Bézier curve 51, has the same endpoints $E_1$ 410 and $E_2$ 413 as did curve 41 of FIG. 4, but different attraction points $C_1$ 511 and $C_2$ 512. Ray($E_1,C_1$) 514 and ray($E_2,C_2$) 515 intersect at point I. Convex hull 518 is defined by triangle($E_1, C_1,E_2$). However, attraction point 511 does not play a dual attraction role as did the single attraction point $C_0$ 311 for curve 31 in FIG. 3. In fact, convex hull 518 contains a second attraction point $C_2$ 512. Inflection point P 517 is an anomalous point, and region 519 bounded by triangle($E_1,I,E_2$) does not contain Bézier curve 51. Therefore, region 519 is not a domain triangle, and Bézier curve 51 is not a simple Bézier arch.

Considering variants (not shown) of curve 51, an inflection point at an interior point of the curve would also arise if $C_2$ were located anywhere else in convex hull 518, except on line-segment($E_2,C_1$). If $C_2$ were located anywhere on line-segment($E_1,C_1$), the curve would also have an inflection point at $E_D$ rather than at an interior point of the curve. (Although an inflection point was defined earlier in terms of a change of curve behaviour at that point, this change may take place at a transition between the Bézier curve of concern, defined by a parameter t in the interval [0,1], and what is termed herein an "extraneous extension" of the curve, when the $t<0$ or $t>1$.) If $C_2$ were located anywhere on line-segment($E_1,C_2$), the curve would also an inflection point at $E_2$, in addition to at an interior point of the curve, with one exception: If $C_1$ and $C_2$ are co-incident (the first variant of curve 31, not shown), $C_2$ is on both of the aforementioned line segments, hence the curve would have inflection points at both endpoints, not in the interior of the curve. Inflection points that are not at interior points of the curve are not classified as anomalous, as they do not impose an impediment to rendering over the whole triangle to encompass the entire simple Bézier arch.

The second example shown in FIG. 5, Bézier curve 52, also runs from $E_1$ 410 to $E_2$ 413, but attraction points $C_1$ 521 and $C_2$ 522 are in swapped positions compared to attraction points $C_1$ 411 and $C_2$ 412 for curve 41 of FIG. 4. The ordering of the attraction points is significant, because $C_1$ 521 determines the direction by which curve 52 leaves $E_1$ 521, and $C_2$ 522 determines the direction by which curve 52 approaches $E_2$ 522. Convex hull 528 is now defined by quadrilateral($E_1,C_2,C_1,E_2$). Ray($E_1,P_1$) 524 and ray ($E_2,P_2$) 525 intersect at point 1526. However, region 529 bounded by triangle($E_1,I,E_2$) does not contain Bézier curve 52; in fact, it merely touches endpoints $E_1$ 410 and $E_2$ 413. Therefore, region 529 is not a domain triangle, and Bézier curve 52 is not a simple Bézier arch. Note that, in this case, cusp P 527 is another type of anomalous point on the curve. Attraction points $C_1$ 521 and $C_2$ 522 tug Bézier curve 52 in what could be considered opposing manners. The result is that, at cusp P527, there is a discontinuity in the direction Bézier curve 52 heads as it runs from $E_1$ 410 to $E_2$ 413; the curve enters and leaves the cusp along the same tangent line (not shown), but in exact opposite directions. (As with inflection points, a cusp can occur at an endpoint of the Bézier curve of concern; the change in behaviour is exhibited by what is termed herein the "full curve," i.e., the curve whose points are given by $f(t)=<x(t),y(t)>$ for values of all real values of t. However, as with inflection points, a non-interior cusp will not be classified as an anomalous point for the purposes of this disclosure.)

The third example shown in FIG. 5, Bézier curve 53, again runs from $E_1$ 410 to $E_2$ 413, but attraction points $C_1$ 531 and $C_2$ 532 are now tugging the curve in such radically opposing fashions that a loop 53l is formed, so that the curve has a self-intersection point P 537, which is another type of anomalous point. As always, convex hull 538 contains curve 53. As with curve 52, ray($E_1,P_1$) 534 and ray($E_2,P_2$) 535 intersect at point 1536, but region 539 bounded by triangle($E_1,I,E_2$) touches curve 53 only at endpoints $E_1$ 410 and $E_2$ 413. Therefore, region 539 is not a domain triangle, and Bézier curve 53 is not a simple Bézier arch.

There are two variants (not shown) of curve 53. In a first variant, one of the endpoints coincides with self-intersection point P. This is an example of an endpoint that is co-incident with an interior point of the curve; the curve consists of a loop and a tail. In a second variant, both endpoints coincide with self-intersection point P. This is an example of a Bézier curve beginning and ending at the same point; the curve consists of a loop. For both of these variants of curve 53, ray($E_1,P_1$) and ray($E_2,P_2$) diverge, so, unlike for curve 53, no intersection point I is defined. However, in the second variant, it is not necessary to classify the self-intersection point as an anomalous point, since it is not at an interior point of the curve. As will become apparent later, subdividing the curve at a non-interior point serves no purpose, and the divergence of the rays (already mentioned in reference to FIG. 4) is global type of anomaly that will flag a loop as needing remediation.

The final example of a Bézier curve that is not a simple Bézier arch presents the most subtle type of anomaly. Bézier curve 54 from $E_1$ 540 to $E_2$ 543 is deceptively similar to Bézier curve 34, which is a simple Bézier arch. As for Bézier curve 34, ray($E_1,P_1$) 544 and ray($E_2,P_2$) 545 intersect at point I 546, and region 549 bounded by triangle($E_1,I,E_2$) contains convex hull 548 and, a fortiori, Bézier curve 54. The difference is that the positioning and weighting of attraction points $C_1$ 541 and $C_2$ 542 has an effect beyond Bézier curve 54 from $E_1$ 540 to $E_2$ 543 that figuratively comes back to bite us. Recall that there are different ways to express the same set of points. Bézier curve 54 is a cubic curve; in particular, a parametric equation for it is of degree three, and an implicit equation for it is of degree three. We have thus far discussed only parametrizations over an interval [0,1]. But the same function defines what will be termed herein a "full curve," whose points are given by f(t)=<x(t),y(t)> for values of all real values of t. It comprises the "desired curve,"—whose points are given by f(t)=<x(t),y(t)> for values of t in the interval [0,1]—and two "extraneous extensions" of the curve—whose points are given by f(t)=<x(t),y(t)> for values of t outside the interval [0,1]; one extraneous extension of curve corresponds to t>1 and the other to t<0. Desired curve 54 is one of three parts of the full Bézier curve defined f(t)=<x(t),y(t)> for all real values of t, the other two parts being extraneous extensions of the desired curve. Extraneous extension 54x of curve 54 shown in FIG. 5 is the continuation of curve 54 beyond endpoint $E_2$ 543, i.e., for values of t>1. Likewise, an implicit equation for Bézier curve 54 would define the same full curve and, in particular, the same extraneous extension 54x.

This is where the distinction between defining the same curve parametrically and implicitly becomes important. For a parametric equation, it is easy to make the curve begin at t=0 and end at t=1. An implicit definition, though advantageous for rendering a domain triangle, has the disadvantage of lacking the start-stop control of a parametric definition. The extended curve 54/54x has self-intersection point P 547—yet another type of anomalous point—and forms a loop enclosing region 5d within triangle($E_1,I,E_2$) 549 and region 5f outside triangle($E_1,I,E_2$) 549. Unlike the situation of Bézier curve 53, which also had a loop and a self-intersection point, the loop and point of intersection (between the desired curve and the extraneous extension of the curve) might, initially appear to be irrelevant, as they are not part of Bézier curve 54, and triangle 549 entirely contains the Bézier curve.

The reason Bézier curve 54 is not classified as a simple Bézier arch, and triangle($E_1,I,E_2$) 549 cannot serve as a domain triangle for the purposes of the method disclosed herein is that implicit calculations don't know when to start and stop: They cannot distinguish between desired Bézier curve 54 and extraneous extension 54x. If an implicit equation were used to render only the curve itself (and not the regions on either side), by rendering precisely the points within triangle($E_1,I,E_2$) 549 that satisfy f(x,y)=0, the parts of extraneous extension 54x that separate regions 5b and 5c and that separate regions 5d and 5e would be rendered in addition to desired Bézier curve 54. More commonly, the goal is to use the sign of f(x,y) to render differently the two regions (viz., convex region 5d/5e and concave region 5a/5b/5c) into which Bézier curve 54 divides triangle($E_1,I,E_2$) 549. What would happen in practice is that the sign of f(x,y) would alternate in a "checkerboard fashion" according to the four regions (viz., 5a/5b, 5c, 5d, and 5e) into which the full curve 54/54x divides triangle($E_1,I,E_2$) 549. Specifically, regions 5a/5b and 5e would correspond to f(x,y)<0, while regions 5c and 5d would correspond to f(x,y)>0, or vice versa. Therefore, in circumstances such as these, a rendering based on the sign of f(x,y) does not result in the desired rendering of triangle($E_1,I,E_2$) 549 according to a partitioning of it by Bézier curve 54 alone. So curve 54 fails to be a simple Bézier arch, due to the "stealthy" anomalous point P 547.

To summarize, a simple Bézier arch is a Bézier curve that satisfies the following two conditions. First, the curve does not contain as an interior point (i.e., a point that would correspond to f(t)=<x(t),y(t)>, with 0<t<1) any inflection point, cusp, self-intersection point, or point of intersection with an extraneous extension of the curve. Second, ray($E_1,P_1$) and ray($E_2,P_2$) as defined above must intersect. The domain triangle for a simple Bézier arch is triangle($E_1,I,E_2$) as defined above.

Figure 6:
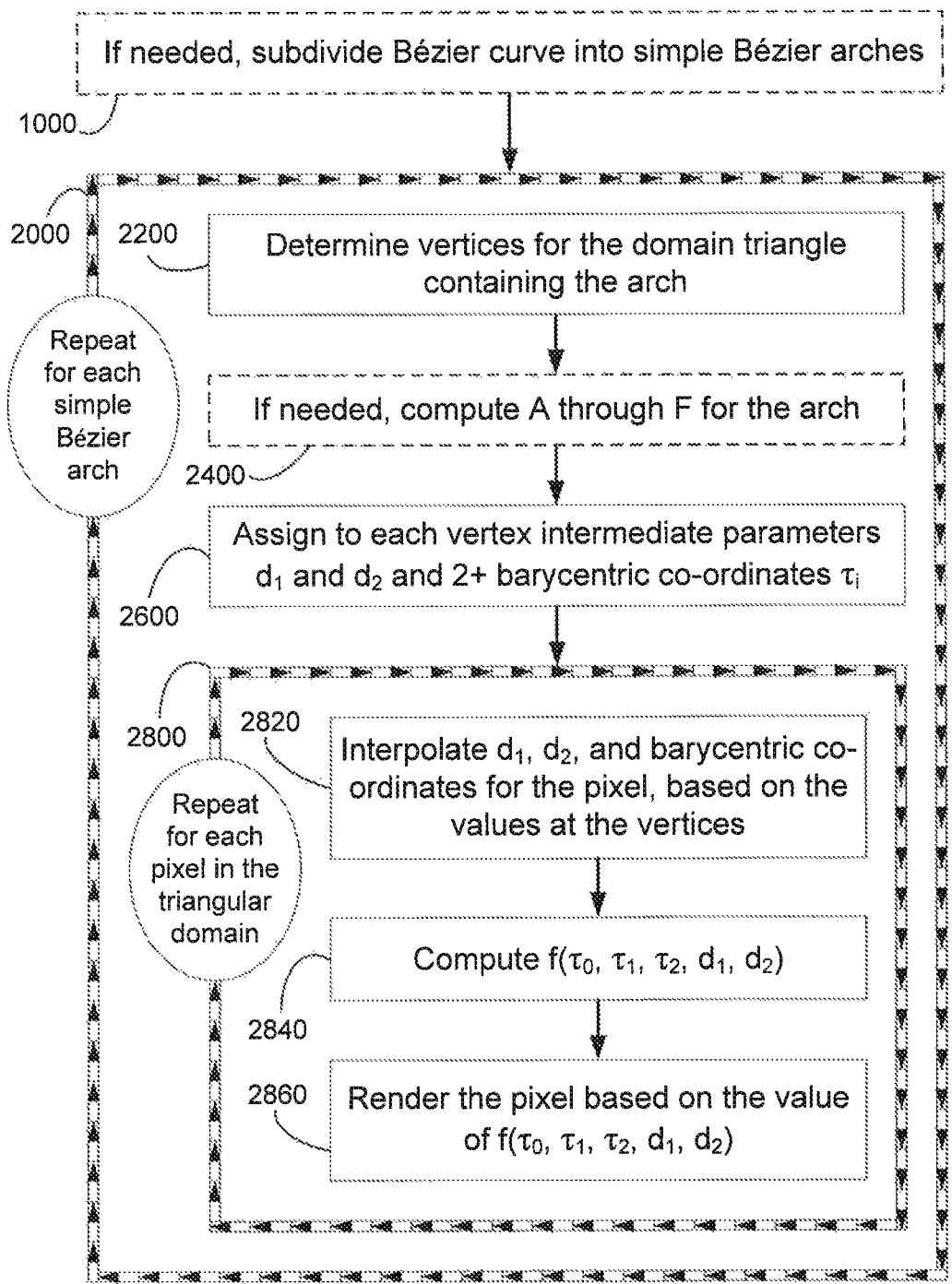
FIG. 6 shows a flowchart for a method of rendering pixels based in a Bézier curve having at most four control points.

Turning now to FIG. 6, a flowchart is depicted for a method of rendering pixels based on a Bézier curve. If the Bézier curve is already a simple Bézier arch, the method of step 2000 can be applied for the arch. However, if the Bézier curve is not a simple Bézier arch—in other words, it suffers from one of the defects described in relation to FIGS. 3 to 5—step 1000 must be applied to subdivide the curve into simple Bézier arches so that the method of step 2000 can be applied for each arch.

Figure 7:
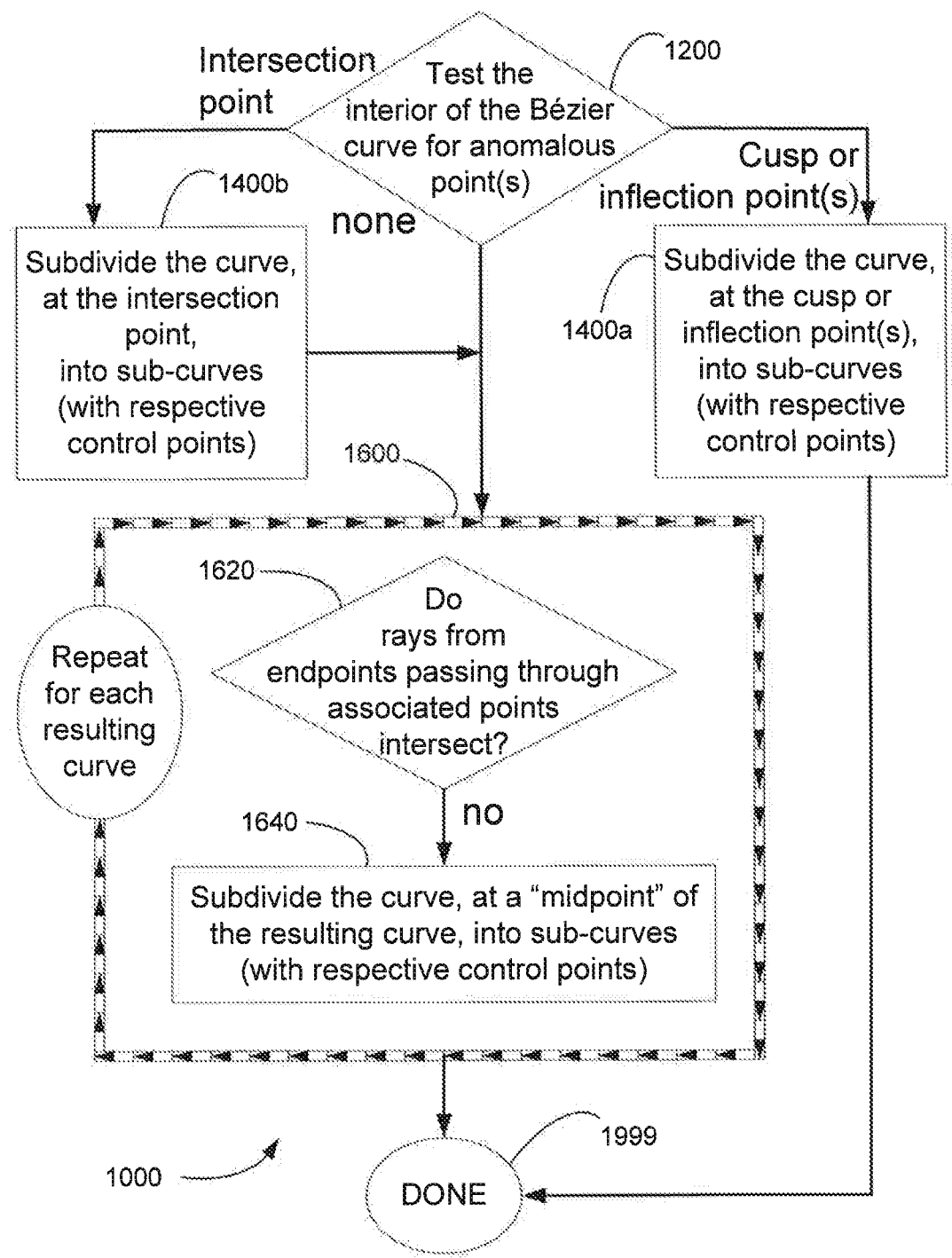
FIG. 7 shows flowchart for a method of subdividing a Bézier curve having at most four control points into simple Bézier arches, if necessary.

Turning to FIG. 7, a flowchart depicts the sub-steps by which a Bézier curve is sub-divided, if necessary, at step 1000. First, at step 1200, using known techniques, the interior of the curve is tested for the existence of anomalous point(s) of any of the types defined in reference to FIGS. 4 and 5. The types of anomalous point are: an inflection point (e.g., point P 437 on curve 43 or point P 517 on curve 51), a cusp (e.g., point P 527 on curve 52), a self-intersection point (e.g., point P 537 on curve 53), or a point of intersection between the curve and an extraneous extension of the curve (e.g., point P 547 on curve 54/54x); the last two types are collectively referred to as "intersection points."

There are two reasons why step 1200 need not flag (as a place at which to subdivide the curve) any inflection point, cusp, or intersection point that is not an interior point. First, as meant herein, "subdividing" a curve means that each resulting part comprises more than a single point; in other words, there will be no pointless subdividing. (Recall that in the first variant of curve 53 described in reference to FIG. 5, there is a self-intersection point formed because an endpoint is coincident with an interior point; subdividing at that anomalous point results in a loop and one "tail.") Second, the only type of non-interior point that creates a situation requiring subdividing is a self-intersection point of a curve that constitutes a loop beginning and ending at that point. In that case, the subdividing must take place elsewhere in the curve than at that point and elsewhere in step 1000 than at step 1400a/b.

The number of anomalous points a Bézier curve can have is limited by the number of control points; it requires more control points to make the curve take more twists and turns. In the present situation, in which we are dealing only with Bézier curves that have one or two attraction points, when the curve is tested at step 1200, there are only five possible outcomes: no anomalous points, one intersection point, one cusp, one inflection point, or two inflection points. Thus, step 1200 will flag at most two anomalous points at which the curve should be subdivided.

Subdivision, for the purposes of the methods of step 2000 disclosed herein, does not comprise merely breaking the curve into parts. All three or four control points of a simple Bézier arch are needed to determine the intersection point that forms one of the vertices of the domain triangle that will be rendered in accordance with step 2000. Therefore, subdividing a Bézier curve into sub-curves means, herein, subdividing it into sub-Bézier curves. In particular, not only the endpoints, but also the appropriate attraction point(s)—including respective weight(s)—for each sub-curve must be determined (by well known methods), so that the sub-curves, thus "controlled," together comprise exactly the same set of points as the original Bézier curve.

Despite the four different types of anomalous points, a cusp and an inflection point can be treated the same way, and both types of intersection point (a self-intersection point and a point of intersection with an extraneous extension of the curve) can be treated the same way. Thus, there are effectively three possible outcomes of test 1200. If a cusp or one or two inflection points are found in the interior of the curve at step 1200, then execution proceeds to step 1400a, at which the Bézier curve is subdivided at the anomalous point(s) found. If an intersection point of either type is detected by test 1200, execution proceeds to step 1400b, which subdivides the curve in the same way step 1400a would. The difference is that execution must proceed to step 1600, since a resulting sub-curve might suffer from the defects of curve 41 or curve 42 of FIG. 4, in which case it would require further subdividing. In the case when the anomalous point found is a self-intersection point, the subdivision will result in two or three sub-curves, one of which will be a loop (such as 53l in curve 53 of FIG. 5), which will always need further subdividing; the other sub-curve(s) might or might not be simple Bézier arch(es). In the case when the anomalous point found is an intersection with an extraneous extension of the curve, the other two sub-curves might or might not be simple Bézier arches.

If at test 1200, no anomalous point is found in the interior of the curve, it may still be the case that the curve fails to be a simple Bézier arch, as was the case with curves 41 and 42 of FIG. 4. Thus, execution proceeds to step 1600.

The input to step 1600 is one or more "resulting" curves: either (a) one, original curve, if no anomalous point was found at test 1200, or (b) two or three sub-curves created at step 1400b. It is possible that a resulting curve is not amenable to the methods of step 2000 disclosed herein, because it suffers from the defects of curve 41 or curve 42 of FIG. 4. Step 1600, as depicted in FIG. 7, is over-simplified in the sense that the sub-steps therein are said to be repeated for each resulting curve. In fact, a loop (such as 53l in curve 53 of FIG. 5) that would result from subdividing at a self-intersection point always suffers from said defect. Thus, one of the sub-curves resulting from subdividing at a self-intersection point need not undergo the test at step 1620; in other words, for that loop, processing could skip directly to 1640 (which would speed processing a bit).

In continuing reference to FIG. 7, step 1600 begins (except for loops, as just noted) by determining, at step 1620, whether there is a domain triangle (as defined herein) containing the current resulting curve. In practice, this determination is done as follows. Regardless of whether the resulting curve has a control sequence of the form $E_1$, $C_0$, $E_2$ or of the form $E_1$, $C_1$, $C_2$, $E_2$, to account for all the possible cases (including when one of $C_1$ and $C_2$ is co-incident with the adjacent endpoint), the attraction point $P_1$ associated with (in the sense defined herein) $E_1$ and the attraction point $P_2$ associated with $E_2$ must be determined. This means that the attraction point associated with an endpoint is the closest one in the control-sequence order that is not co-incident with the endpoint. This is so that ray($E_1$,$P_1$) and ray($E_2$,$P_2$) are each well-defined. The test at step 1620 can then be completed by determining whether these rays intersect. If so, the resulting curve is a simple Bézier arch because there is no anomalous point in the interior of the curve, and the intersection point I of the two rays is the third vertex of a domain triangle. This determination is a simple calculation based on Cartesian geometry.

If the rays do not intersect, then execution proceeds to step 1640, at which the curve is subdivided at some point other than its endpoints. For any type of curve needing subdividing at step 1640, even when the curve is a loop beginning and ending at the same point, the subdividing will result in two sub-curves.

If a dividing point of the curve were chosen at random and ended up being too close to one of the endpoints of the curve, the longer of the two sub-curves could end up with the same defect step 1640 is meant to cure. This would be more likely to occur when randomly subdividing a loop. If this happened, a subsequent subdivision would be necessary. There are different approaches to assuring that the final result of step 1600 is that the Bézier curve is either a simple Bézier arch or has been subdivided into curve simple Bézier arches. One approach is to perform step 1600 iteratively, so that test 1620 is applied not only to each curve resulting form steps 1200 and 1400, but also to any sub-curve resulting from step 1640; if subdividing points are chosen at random, this approach does not guarantee completion of step 1600 in any given number of steps.

An alternative approach is to choose the dividing point more deliberately at step 1640. In some embodiments, the point chosen is a "midpoint" of the curve. As meant herein, this is a broad term that includes any point chosen so that, for each of the two sub-curves, the resulting two tangent rays (emanating from the sub-curve's endpoints and passing through the respective associated attraction points) intersect. One approach, using Cartesian-geometry techniques, is as follows. First, determine an attraction point $P_1$ associated with the curve's initial endpoint $E_1$; this would be the attraction point next in the control-sequence order (i.e., $C_1$), unless the two points are co-incident, in which case it would be $C_2$. (Recall that there must be two attraction points, since quadratic curves never suffer the defect that requires subdividing at step 1640.) Likewise, an attraction point $P_2$ associated with said curve's terminal endpoint $E_2$. Next, determine ray($E_1$, $P_1$), ray($E_2$,$P_2$), and a ray R bisecting the interior angle between ray($E_1$,$P_1$) and ray($E_2$,$P_2$); this angle is the smaller of the two angles (the one measuring less than 180°) so that R points generally in the direction of ray($E_1$,$P_1$) and ray($E_2$,$P_2$) rather than opposite them. Finally, determine a point M on the curve at which a tangent to said curve is perpendicular to R.

Returning to FIG. 6, after execution of step 1000, either the original Bézier curve has been determined to be a single simple Bézier arch, or it has been is subdivided into simple Bézier arches, if necessary. Then step 2000 is performed by repeating step 2200, 2400, 2600, and 2800 for each simple Bézier arch; with 2400 being omitted for an arch having only three control points. Each of these four steps will be described next in terms of a single simple Bézier arch. Steps 2200, 2400, and 2600 are part of what takes place in curve pre-processing 220 and vertex shading 230 in FIG. 2; the computations are performed for each of the three vertices of the domain triangle containing the simple Bézier arch. Step 2800 is part of pixel shading 240 in FIG. 2; computations are performed for pixel of the domain triangle containing the simple Bézier arch.

At step 2200, the vertices of the domain triangle containing the simple Bézier arch are determined; this step can be performed by the pre-processing program 156 of FIG. 1. Regardless of whether the arch is an arch that was originally specified in graphics model 158 or is an arch that resulted from a subdividing at step 1000, the arch is specified in terms of the its control sequence, which is of either the form $E_1$, $C_0$, $E_2$ or the form $E_1$, $C_1$, $C_2$, $E_2$. As was illustrated in reference to FIG.

3, the following steps are performed. First, the attraction points $P_1$ and $P_2$ associated with (in the sense defined herein) $E_1$ and $E_2$, respectively, are determined; the attraction point associated with an endpoint is the closest one in the control-sequence order that is not co-incident with the endpoint. Second, ray($E_1,P_1$) and ray($E_2,P_2$) are determined; each ray is well-defined by virtue of the way associated attraction points are determined. Third, intersection point I of ray($E_1,P_1$) and ray($E_2,P_2$) is determined; this intersection is well-defined because this is one of the conditions imposed on a Bézier curve for it to be a simple Bézier arch; computing the intersection point I is a simple matter of basic Cartesian geometry. Finally, the vertices of the domain triangle are: $E_1$, I, and $E_2$; these are renamed $\tau_0$, $\tau_1$, and $\tau_2$, respectively for notational convenience in the foregoing steps.

Next, at step 2400, further triangle pre-processing is performed if the current arch has four control points ($E_1, C_1, C_2, E_2$), and the arch is not equivalent to a quadratic curve; this step can also be performed by pre-processing program 156 of FIG. 1. Parameters A, B, C, D, E, and F are dependent only on the arch, so they need only be computed once for the arch. They are needed for computing two input parameters for the implicit function disclosed herein, except in the case when the function is quadratic. The six parameters A, B, C, D, E, and F are computed as follows.

Let $w_1$ and $w_2$ be the weights associated with the attraction points $C_1$ and $C_2$, respectively. The weights are amongst the parameters of an original Bézier curve specified as part of graphics model 158 or are calculated as parameters of a simple Bézier arch obtained by subdividing at step 1000.

Barycentric co-ordinates of a pixel provide weightings that can be used to effectively express the Cartesian position of the pixel as a linear combination of the vertices (viz., as a vector sum of scalar multiples of vectors: $\tau_0 T_0 + \tau_1 T_1 + \tau_2 T_2$). Similarly, any point on a line segment between two endpoints, R and S, of the segment can be expressed as a linear combination $\rho R + \sigma S$ of R and S. In analogy with barycentric co-ordinates, $\rho + \sigma = 1$, $\rho = 1$ at R, $\rho = 0$ at S, $\sigma = 1$ at S, $\sigma = 0$ at R, and $\rho$ and $\sigma$ are each in the interval [0,1] if the point in the line segment. As proportions, $\rho$ and $\sigma$ represent the relative "attraction" each endpoint has on the point in question. When the line segment is one edge of a triangle, $\rho$ and $\sigma$ are effectively two barycentric co-ordinates of the point in question, where the third co-ordinate, corresponding to the third vertex, is irrelevant (i.e., zero) everywhere on that line segment. It is a simple calculation using Cartesian geometry to find these "co-ordinates" $\rho$ and $\sigma$ for a given point on the line segment. In particular, since intersection point I is on ray($E_1,P_1$) and the domain triangle contains the convex hull of the control points, it follows that $C_1$ lies in line-segment($E_1$,I)—even in the special case when $C_1$ is co-incident with $E_1$ and I is $C_2$—and it is easy to find $\lambda_1$ such that $C_1 = (1-\lambda_1) E_1 + \lambda_1 I$. Similarly, $\lambda_2$ satisfying $C_2 = (1-\lambda_2) E_2 + \lambda_2 I$ can be found. (The cases when $C_1$ is co-incident with $E_2$ and when $C_2$ is co-incident with $E_1$ do not occur because the intersection point I is an endpoint, the triangle is degenerate, and therefore the curve would need to be subdivided at an inflection point.)

Four more parameters are computed in terms of the weights ("attractions") $w_1$ and $w_2$ associated with the two attraction points $C_1$ and $C_2$, respectively, and the proportions (analogous to "attractions") $\lambda_1$ and $\lambda_2$ that reflect how close each of those attraction points is to intersection point I.

$$\alpha_1 = 3w_1(1-\lambda_1);$$

$$\alpha_2 = 3w_2(1-\lambda_2);$$

$$\beta_1 = 3w_1\lambda_1;$$

$$\beta_2 = 3w_2\lambda_2.$$

Each of $\lambda_1, \lambda_2, \alpha_1, \alpha_2, \beta_1$, and $\beta_2$ is an intermediate calculation dependent only on the arch and the domain triangle it defines.

Finally, the six arch-specific parameters that will actually be used in computations for shading each pixel in the domain triangle are computed as follows by Curve Pre-Processing 220.

$$A = -\beta_1^2(\beta_1 - \beta_2\alpha_2);$$

$$B = -\beta_2^2(\beta_2 - \beta_1\alpha_1);$$

$$C = -3\beta_1\beta_2 + 2\beta_1^2\alpha_1 + 2\beta_2^2\alpha_2 - \beta_1\beta_2\alpha_1\alpha_2;$$

$$D = \alpha_2(\beta_1 - \beta_2\alpha_2);$$

$$E = \alpha_1(\beta_2 - \beta_1\alpha_1);$$

$$F = 1 - \alpha_1\alpha_2.$$

To prepare for vertex shading 230, attributes are computed for each of the three vertices of the domain triangle containing the simple Bézier arch. These attributes may include colour and texture information needed to render the pixels of the domain triangle. Different attributes will apply to different sides of the current arch. Which attributes apply to each pixel is based on the value of a function f(_) disclosed herein. The sign of f(_) determines whether a pixel is on the simple Bézier arch (when f(_)=0), is on one side of the arch (when f(_)>0), or is on the other side of the arch (when f(_)<0). This tripartite determination of where a pixel is located relative to the arch can then be used to determine which other attributes are applied to the pixel. For example, one colour may be applied to the region for which f(_)<0, and a different colour may be applied to the region for which f(_)≥0. Highly efficient interpolation of the vertices' attributes across the domain triangle will be a key to the efficient calculation of attributes at individual pixels of the domain triangle.

In particular, parameters that are the input for f(_) and that also can be computed efficiently across the domain triangle are assigned to each vertex of the domain triangle at step 2600.

The function f(_) for implicitly defining a simple Bézier arch according to the present disclosure is not expressed in terms of rectangular (i.e., Cartesian) coordinates as is well known; in other words, it is not expressed as f(x,y). Nor is it expressed in terms of four intermediate parameters as is also known; in particular, it is not expressed as f(k,l,m,n) as has been done by Loop and Blinn (op cit.). Rather, it is expressed in terms of five variables. While this might appear to result in a more complex computation, as will be shown, there are advantages to this formulation. Three of the inputs to the function f(_,_,_,_,_) are barycentric coordinates $\tau_0, \tau_1$, and $\tau_2$ corresponding, respectively, to the domain triangle's vertices, $E_1$, I, and $E_2$, which are re-named, respectively, as $T_0, T_1$, and $T_2$ for notational concordance. These coordinates are assigned to the vertices of the domain triangle as follows: $T_0 = <1,0,0>$; $T_1 = <0,1,0>$; $T_2 = <0,0,1>$. As is well known, barycentric coordinates have the following properties. For each pixel of the domain triangle, its barycentric coordinates are bilinear in its rectangular co-ordinates, which are the co-ordinates by which a pixel shader identifies each pixel. It follows that $\tau_0 = \tau_0(x,y)$, $\tau_1 = \tau_1(x,y)$, and $\tau_2 = \tau_2(x,y)$ can be linearly interpolated throughout the domain triangle. Furthermore, barycentric coordinates are always linearly related according to the expression $\tau_0 + \tau_1 + \tau_2 = 1$; in effect, each pixel's barycentric co-ordinates express weightings according to how close it is to each of the three vertices. It follows that any barycentric co-ordinate can be calculated from the other two.

As a consequence, the interpolation of barycentric co-ordinates can be accomplished two different ways. In one approach, all three barycentric co-ordinates can be assigned to all three vertices of the domain triangle and all three barycentric co-ordinates can be interpolated from those three barycentric co-ordinates for the three vertices. In another approach, only two (it matters not which two) of the three are interpolated, and the third is computed for each pixel. Thus, at step 2600, at least two of the three barycentric co-ordinates (the same three) are assigned (as specified above) to all three vertices of the domain triangle.

The two remaining input parameters assigned to each vertex of the domain triangle at step 2600, $d_1$ and $d_2$, are termed herein "intermediate parameters" as they are designed to facilitate efficient computations. How $d_1$ and $d_2$ are computed depends on whether the "true" degree of the simple Bézier arch is cubic or quadratic. For cubic Bézier curves that do not have an equivalent quadratic representation, $d_1$ and $d_2$ are each dependent both on the arch and on the position of a pixel. For quadratic Bézier curves, they are each dependent only on the arch. There are situations when, due to the particular positions of $C_1$ and $C_2$ and the particular values of the weights $w_1$ and $w_2$, a cubic Bézier curve can be represented equivalently as a quadratic Bézier curve with a control sequence comprising $E_1$, $C_3$, and $E_2$. It is known how to determine whether a cubic Bézier curve can be represented equivalently as a quadratic Bézier curve and, if so, how to find $C_3$; in fact, $C_3$ will play the role of $C_0$ 311/331 in FIG. 3 and will be the intersection point of ray($E_1,P_1$) and ray($E_2,P_2$). For the purposes of the methods described herein, any cubic Bézier curve that has an equivalent representation as a quadratic Bézier curve is transformed into that representation in Curve Pre-Processing 220 of FIG. 2 and $d_1$ and $d_2$ are computed according to the quadratic case described later.

In the case where there are two attraction points and the cubic Bézier curve does not have an equivalent quadratic form, for each pixel in the domain triangle, the two intermediate parameters $d_1$ and $d_2$ must, by some means, be computed as follows:

$$d_1 = A\tau_0 + C\tau_1 + B\tau_2; \tag{1}$$

$$d_2 = D\tau_0 + F\tau_1 + E\tau_2. \tag{2}$$

In fact, since each of $d_1$ and $d_2$ is a tri-linear function of the barycentric co-ordinates, it can be very efficiently interpolated throughout the domain triangle. Thus, at step 2600, the values of $d_1$ and $d_2$ are assigned to each vertex of the domain triangle as follows:

at vertex $T_0$, $d_1=A$ and $d_2=D$;
at vertex $T_1$, $d_1=C$ and $d_2=F$;
at vertex $T_2$, $d_1=B$ and $d_2=E$.

If, on the other hand, (a) the arch as originally specified has a single attraction point $C_0$ (as for curves 31 and 33 in FIG. 3) or (b) the arch as originally specified has two attraction points $C_1$ and $C_2$, but the arch is quadratic (and has an equivalent control sequence of the form $E_1$, $C_3$, $E_2$), then $$d_1 = -4w \text{ and } d_2 \equiv 1 \tag{3}$$

for all pixels in the domain triangle. In this case, the parameters A, B, C, D, E, and F need not be computed, and $d_1$ and $d_2$ will not need to be interpolated across the domain triangle.

Still in reference to FIG. 6, all triangle-level pre-processing having been completed at step 2600, execution proceeds next to step 2800, in which steps 2820, 2840, and 2860 are performed for each pixel in the current domain triangle. Each of these three steps will be described next in terms of a single pixel.

At step 2820, the barycentric co-ordinates $\tau_0$, $\tau_1$, and $\tau_2$ of the pixel are interpolated for the pixel, based on the values of the barycentric co-ordinates of the vertices of the domain triangle. This is a very efficient calculation, as each co-ordinate is linear in each of the rectangular co-ordinates (x and y) that a pixel shader uses to identify each pixel. As stated earlier, the interpolation of the barycentric co-ordinates can be implemented with or without exploiting the linear relationship amongst the three co-ordinates. In one approach, all three co-ordinates are assigned to vertices and interpolated for each pixel. In another approach, only two co-ordinates are assigned and interpolated; the third one is computed on a pixel-by-pixel basis from the two that are interpolated.

The intermediate parameters $d_1$ and $d_2$ are likewise linear in each of the rectangular co-ordinates. In the case where there are two distinct attraction points and the simple Bézier arch does not have an equivalent quadratic form, they each must be interpolated, as each varies with pixel position. In the case where there is a single attraction point or the original arch has an equivalent quadratic form, $d_1$ and $d_2$ are each constant throughout the domain triangle as specified above and, therefore, need not be interpolated. However, they can be interpolated, nonetheless. One advantage of the methods disclosed herein is that a single approach can handle two different situations that previously would require two different approaches. Thus, a shader program can be programmed in such a way that, by merely changing the attributes assigned to vertices, the same shader program can adapt to handle simple Bézier arches with either three or four control points. Although it might appear that interpolating $d_1$ and $d_2$ needlessly would be disadvantageous, there are advantages to not having to switch between two different shader programs to handle two different types of arches.

At step 2840, the culminating computation is performed for the pixel:

$$f(\tau_0, \tau_1, \tau_2, d_1, d_2) = \tau_0 \tau_2 d_1 + \tau_1^2 d_2 \tag{4}$$

Each of the input parameters can be linearly interpolated for the current pixel based on their respective values for the three vertices of the domain triangle. The computation requires, in addition to the interpolation, only four multiplications and one addition.

To see that this function implicitly defines the desired simple Bézier arch, the cubic and quadratic cases must be considered separately.

For a simple Bézier arch of degree three that does not have an equivalent quadratic form, the computation of $f(\tau_0, \tau_1, \tau_2, d_1, d_2)$ according to Equation (4) requires the use of Equations (1) and (2) to define the parameters $d_1$ and $d_2$. After using Equation (1) to substitute the defining expression for $d_1$ and Equation (2) to substitute the defining expression for $d_2$, the expression on the right-hand side of Equation (4) can be routinely expanded to verify that, in this (cubic) case, computation of $f(\tau_0, \tau_1, \tau_2, d_1, d_2)$ gives a value of:

$$A\tau_0^2\tau_2 + B\tau_0\tau_2^2 + C\tau_0\tau_1\tau_2 + D\tau_0\tau_1^2 + E\tau_1^2\tau_2 + F\tau_1^3 \tag{5}$$

Floater (op cit.) has verified that Expression (5) satisfies a known parametric expression for a cubic Bézier curve in terms of cubic Bernstein-Bézier basis functions.

Equation (5) fails for quadratic curves written in cubic form. However, for a quadratic simple Bézier arch (when there is a single attraction point or the original arch has an equivalent quadratic form), the computation of $f(\tau_0, \tau_1, \tau_2, d_1, d_2)$ according to Equation (4) requires the use of the definitions of the parameters $d_1$ and $d_2$ as constants in (3). After substitution of $d_1 = -4w^2$ and $d_2 \equiv 1$ into Equation (4), the expression on the right-hand side of Equation (4) can be routinely expanded to verify that, in this (quadratic) case, computation of $f(\tau_0, \tau_1, \tau_2, d_1, d_2)$ gives a value of:

$$-4w^2\tau_0\tau_2 + \tau 1^2, \quad (6)$$

which is quadratic, because w is constant. Floater (ibid.) has shown that Expression (6) satisfies a known parametric expression for a quadratic Bézier curve in terms of quadratic Bernstein-Bézier basis functions.

That the expression on the right side of Equation (4) evaluates to 0 only for the desired simple Bézier arch—and not for any extraneous extension of the arch—follows from the way the concept "simple Bézier arch" has been defined, specifically, to preclude an intersection of the curve with any extraneous extension of the curve at an interior point of the curve. The need to handle anomalous points only arises for cubic curves. Recall that subdividing a quadratic Bézier curve is never required to ensure a simple Bézier arch is being handled; a single attraction point simply cannot direct a curve into anomalous shapes such as those depicted in FIGS. 4 and 5.

From what has already been said, although Equation (4) is expressed in terms of five parameters, the linear relationship between the barycentric co-ordinates means one of the barycentric co-ordinates can be computed from the other two to reduce the number of explicit attributes assigned to each vertex. This can be done either by making this computation an added step executed by the pixel shader (on a pixel-by-pixel basis) or an added step executed by the vertex shader.

Finally, at step 2860, the current pixel is rendered based on the value of $f(\tau_0, \tau_1, \tau_2, d_1, d_2)$. For example, the rendering can use a first predetermined set of graphics parameters if the computed value is greater than zero, a second predetermined set of graphics parameters if the computed value is less than zero, and a third predetermined set of graphics parameters if the computed value is equal to zero. If the second and third sets are the same, this is equivalent to using the same graphics parameters when $f(\tau_0, \tau_1, \tau_2, d_1, d_2)=0$ and when $f(\tau_0, \tau_1, \tau_2, d_1, d_2)<0$. An application of this would be drawing a character of a font in only two colours, say black for the outline and interior of the character and white for the exterior.

In other embodiments, bi-partite or tri-partite choices for pixel colours might not be desired. Instead, a smoother look could be achieved by anti-aliasing. For example, the "jaggies" of a black curve on a white background can be removed by using various shades of grey, depending on the how far each pixel is from the "true" curve (a mathematical ideal, not an approximation comprised of pixels with only integer-valued co-ordinates). Specifically, an approximate distance between each pixel (with integer-valued co-ordinates) can be computed, and then the pixel can be anti-aliased based on that approximate distance. One approach to computing the approximate distance is to a quotient of the computed value of $f(\tau_0, \tau_1, \tau_2, d_1, d_2)$ for the current pixel divided by a square root of a sum of respective squares of partial derivatives of the f(_) with respect to respective rectangular co-ordinates, x and y.

It should be noted that Expression (5), aside from not being as adaptable for usage by a shader program as is Equation (4), is also not amenable to GPU-based rendering because of the number of multiplications and additions required on a per-pixel basis compared with Equation (4).

A more interesting comparison is between an actual implementation of the method disclosed herein, based on Equation (4), and a comparable implementation of a method proposed by Loop and Blinn (op cit.). Their method uses a different implicit function with different input parameters than the function $f(\tau_0, \tau_1, \tau_2, d_1, d_2)$ disclosed herein. The function of Loop and Blinn is elegantly defined in terms of its four input parameters; however, its input parameters are more complicated to compute than those for the function $f(\tau_0, \tau_1, \tau_2, d_1, d_2)$ disclosed herein. Another notable difference is that the method of Loop and Blinn subdivides a quadrilateral convex hull of a cubic curve's four control points into two triangles; the convex hull always covers the curve, and the triangles are primitives GPU 130 can render efficiently. On the other hand, the method disclosed herein takes precautions (by subdividing a curve, if needed) to ensure that, for each curve processed at step 2800 of FIG. 6, a single (domain) triangle covers the convex hull and therefore the curve. The respective numbers of triangles processed by each method is highly dependent on the specifics of the computer graphics being rendered.

The two implementations were each applied to render each of the two vector graphic images, created using glyph paths from two different fonts. FIG. 8 shows grey-tone representations (to comply with requirements for patent drawings) of the two renderings, which were "red-and-white" with anti-aliasing (i.e., shades of pink along the red-white interfaces). The glyph paths that defined image 800*q* are from a TrueType font and are splines of line segments and quadratic Bézier curves. The glyph paths that defined image 800*c* are from an OpenType® font and are splines of line segments and cubic Bézier curves.

Both implementations communicated instructions to GPU 130 using the OpenGL ES 2.0 API, currently found on many mobile devices, as API 152. Actual running times were averaged over 1000 trials to account for the variable activity of other processes running on the test device (a tablet computer) at the same time the rendering was taking place.

The results are shown below, broken down by the respective running-time component attributable to two phases of the entire process. For the method disclosed herein, "Computing Attributes" corresponds to the curve pre-processing phase of steps 2200 and (for cubic curves) 2400 and vertex shading of step 2600; "Computing f(_) and Rendering Pixels" is the pixel-wise phase of step 2800. The phase of subdividing curves (step 1000 of the disclosed method) was not timed, because the number of triangles used by each implementation is highly curve-specific. As was mentioned before, the method of Loop and Blinn will need to divide a quadrilateral convex hull into two triangles. The method disclosed herein might, in many cases, be able to render as a single primitive a domain triangle containing an entire convex hull; but, in other cases, it might have to subdivide a given curve into as many as four sub-curves.

| Degree of Curves | Running-Time Component | Loop and Blinn's Method | Method Disclosed |
|---|---|---|---|
| Quadratic and Linear (800 q) | Computing Attributes | negligible | negligible |
|  | Computing f(_) and Rendering Pixels | 12.3 ms | 14.3 ms |
|  | TOTAL | 22.0 ms | 24.2 ms |
| Cubic and Linear (800 c) | Computing Attributes | 7.53 ms | 5.89 ms |
|  | Computing f(_) and Rendering Pixels | 10.6 ms | 12.4 ms |
|  | TOTAL | 74.3 ms | 69.6 ms |

For both quadratic and cubic curves, Loop and Blinn's method is faster in computing f(_) and rendering pixels. For quadratic curves, the time devoted to curve pre-processing is negligible due to the simplicity of the curves. Thus, the method disclosed herein does not make up for its lag in rendering speed. However, for cubic curves, the faster pre-processing time of the method disclosed herein tips the balance in its favour. In fact, the disclosed method's improvement in total processing time for cubic curves is greater than the total-time advantage of Loop and Blinn's method for quadratic curves. For computer graphics defined using more cubic than quadratic Bézier curves, the method disclosed herein provides more efficient way to perform the entire rendering process, including pre-processing.

Certain adaptations and modifications of the described embodiments can be made. Therefore, the above discussed embodiments are considered to be illustrative and not restrictive.

I claim:

1. A method of rendering pixels, comprising:
   retrieving, from a memory of a computing device, a graphics model, the graphics model comprising parameters of Bézier curves having at most four control points, a simple Bézier arch obtainable using the parameters;
   when a Bézier curve of the graphics model is not a simple Bézier arch, subdividing the Bézier curve into simple Bézier arches;
   for each simple Bézier arch defined by a control sequence consisting of (a) an initial endpoint E1, followed by (b) either (i) a single attraction point Co or (ii) a first attraction point C1 followed by a second attraction point C2, followed by (c) a terminal endpoint E2, at least one attraction point being non-co-linear with the endpoints:
   determining, using a pre-processing program executable by a central processing unit of the computing device, a domain triangle containing the arch and having as vertices $E_1$, $E_2$, and an intersection point I of rays emanating from the endpoints and passing through respective attraction points associated with the endpoints; and
   for each pixel in the domain triangle:
       computing, using a shader program executable by a graphics processing unit of the computing device, a value of a function $f(\tau_0, \tau_1, \tau_2, d_1, d_2) = \tau_0 \tau_2 d_1 + \tau_1^2 d_2$, wherein $\tau_0, \tau_1, \tau_2$ are barycentric co-ordinates of that pixel, based on $E_1$, I, and $E_2$, respectively; wherein $d_1$ and $d_2$ are each linear functions of $\tau_0, \tau_1$, and $\tau_2$; and wherein the function evaluates to zero if that pixel is on the arch; and
       rendering, using the graphics processing unit in communication with the central processing unit, that pixel based on the computed value, the graphics processing unit being directed by the shader program;
   wherein rendering that pixel comprises rendering to one or more of: a display device, a file in the memory and a peripheral device.

2. The method of claim 1, wherein, for each pixel, computing a value of the function $f(\tau_0, \tau_1, \tau_2, d_1, d_2)$ for that pixel comprises interpolating values for $d_1$ and $d_2$ and for at least two of $\tau_0, \tau_1$, and $\tau_2$ based on corresponding values for each of the vertices of the domain triangle.

3. The method of claim 1, wherein the respective attraction point associated with each endpoint is closest to that endpoint in control-sequence order and not co-incident with that endpoint.

4. The method of claim 1, wherein, if the control sequence includes $C_1$ and $C_2$, then:

$$d_1 = A\tau_0 + C\tau_1 + B\tau_2; \text{ and}$$

$$d_2 = D\tau_0 + F\tau_1 + E\tau_2;$$

where:

$$A = -\beta_1^2(\beta_1 - \beta_2\alpha_2);$$

$$B = \beta_2^2(\beta_2 - \beta_1\alpha_1);$$

$$C = -3\beta_1\beta_2 + 2\beta_1^2\alpha_1 + 2\beta_2^2\alpha_2 - \beta_1\beta_2\alpha_1\alpha_2;$$

$$D = \alpha_2(\beta_1 - \beta_2\alpha_2);$$

$$E = \alpha_1(\beta_2 - \beta_1\alpha_1);$$

$$F = 1 - \alpha_1\alpha_2;$$

$$\alpha_1 = 3w_1(1 - \lambda_1);$$

$$\beta_1 = 3w_1\lambda_1;$$

$$\beta_2 = 3w_2\lambda_2;$$

$\lambda_1$ satisfies $C_1 = (1 - \lambda_1)E_1 + \lambda_1 I;$ $\lambda_2$ satisfies $C_2 = (1 - \lambda_2)E_2 + \lambda_2 I;$ and $w_1$ and $w_2$ are weights associated with $C_1$ and $C_2$, respectively.

5. The method of claim 1, wherein,
if either:
   the control sequence includes the single attraction point $C_0$, or
   the control sequence includes the two attraction points $C_1$ and $C_2$, but the arch can be equivalently specified by a control sequence with a single attraction point $C_3$;
then $d_1 \equiv -4w^2$ and $d_2 \equiv 1$, wherein w is a weight associated with $C_0$ or $C_3$, as the case may be.

6. The method of claim 1, wherein, for each pixel, rendering that pixel comprises comparing the computed value for that pixel with 0.

7. The method of claim 6, wherein, for each pixel, rendering that pixel further comprises using a first predetermined set of graphics parameters if the computed value for that pixel is greater than zero.

8. The method of claim 7, wherein, for each pixel, rendering that pixel further comprises using a second predetermined set of graphics parameters if the computed value for that pixel is less than zero.

9. The method of claim 8, wherein, for each pixel, rendering that pixel further comprises using a third predetermined set of graphics parameters if the computed value for that pixel is zero.

10. The method of claim 9, wherein the third set of graphics parameters is one of the first set of graphics parameters and the second set of graphics parameters.

11. The method of claim 1, wherein, for each pixel, rendering that pixel comprises:
   computing an approximate distance between that pixel and the arch; and
   anti-aliasing that pixel based on the approximate distance.

12. The method of claim 11, wherein computing the approximate distance comprises computing a quotient of the computed value divided by a square root of a sum of respective squares of partial derivatives of the function with respect to respective rectangular co-ordinates of that pixel.

13. The method of claim 1, wherein subdividing the curve comprises determining a respective control sequence for each of the resulting simple Bézier arches.

14. The method of claim 1, wherein subdividing the curve comprises subdividing the curve into two sub-curves, at one of a cusp and an inflection point.

15. The method of claim 1, wherein subdividing the curve comprises subdividing the curve into a plurality of sub-curves, at one of a self-intersection point and a point of intersection with an extraneous extension of the curve.

16. The method of claim 1, wherein subdividing the curve comprises subdividing the curve or a curve obtained by subdividing the curve at one of a self-intersection point and a point of intersection with an extraneous extension of the curve, at a midpoint of the curve or obtained curve, as the case may be.

17. The method of claim 16, wherein subdividing the curve or obtained curve, as the case may be, at a midpoint comprises:
- determining an attraction point $P_1$ associated with said curve's initial endpoint $E_1$, an attraction point $P_2$ associated with said curve's terminal endpoint $E_2$, ray($E_1$, $P_1$), and ray($E_2$, $P_2$);
- determining that ray($E_1$,$P_1$) and ray($E_2$,$P_2$) do not intersect;
- determining a ray R bisecting the interior angle between ray($E_1$,$P_1$) and ray($E_2$,$P_2$);
- determining a point on said curve at which a tangent to said curve is perpendicular to R; and
- subdividing said curve at the point thus determined.

18. A non-transitory, processor-readable storage medium storing processor-executable instructions that, when executed by a the computing device configures the computing device to perform the method of claim 1, at least in part by means of the central processing unit.

* * * * *